(12) United States Patent
Park

(10) Patent No.: US 7,215,797 B2
(45) Date of Patent: May 8, 2007

(54) IRIS RECOGNITION SYSTEM

(75) Inventor: Se-Woong Park, Soowon (KR)

(73) Assignee: LG Electronics Inc., Seoul (KR)

( * ) Notice: Subject to any disclaimer, the term of this patent is extended or adjusted under 35 U.S.C. 154(b) by 1074 days.

(21) Appl. No.: 09/773,540

(22) Filed: Feb. 2, 2001

(65) Prior Publication Data
US 2002/0106113 A1    Aug. 8, 2002

(51) Int. Cl.
*G06K 9/00*    (2006.01)
(52) U.S. Cl. ...................................... 382/117
(58) Field of Classification Search ................ 382/115, 382/116, 117; 351/200, 206, 221, 245
See application file for complete search history.

(56) References Cited

U.S. PATENT DOCUMENTS

| | | | | |
|---|---|---|---|---|
| 5,548,354 A | * | 8/1996 | Kasahara et al. | 351/206 |
| 5,764,341 A | * | 6/1998 | Fujieda et al. | 351/221 |
| 6,247,813 B1 | * | 6/2001 | Kim et al. | 351/206 |

* cited by examiner

*Primary Examiner*—Vikkram Bali
(74) *Attorney, Agent, or Firm*—Birch, Stewart, Kolasch & Birch, LLP

(57) ABSTRACT

An iris recognition apparatus, includes a guidance unit for guiding the position of an eye relative to the apparatus, and an image recognition unit for recognizing the image of an iris passed through the guidance unit. The apparatus also includes an optical axis adjustment unit for aligning the optical axes of the image recognition unit and guidance unit. The optical axis adjustment unit adjusts the optical axis of the image recognition unit by moving the image recognition unit vertically and horizontally.

21 Claims, 5 Drawing Sheets

IRIS RECOGNITION SYSTEM

BACKGROUND OF THE INVENTION

1. Field of the Invention present invention relates to a personal identification system, and more particularly, to an iris recognition system for identifying persons by recognizing the iris of either eye.

2. Background of the Related Art

As the population of the world has increased and civilization has developed, personal identification has become important. In particular, in airports, financial agencies, research institutes, etc., a variety of methods for identifying persons are used for purposes of maintaining security or controlling access to premises.

The most common such method is an identification card. The identification card may assume a wide variety of forms, such as a simple card bearing a stamp, a card having a magnetic film or IC chip, etc., so as to identify a certain person. However, such an identification card has several limitations for personal identification, such as a risk of loss and a possibility of copying.

Attempts have been made to identify persons using their biological characteristics without any additional identification measures. Such schemes include fingerprint analysis, signature analysis, iris analysis, and the like. The analysis of the iris is performed without any physical contact, unlike other biological identification methods. Iris analysis is appropriate for rapid measurement, because a computer compares an iris pattern captured by a camera with a pre-stored iris pattern. Because no two irises are identical, even in the same person, precise identification is possible with this technique.

An iris recognition system in general includes a guidance unit for guiding an eye to a predetermined position in front of a lens of the iris recognition system in order to image the iris, and a lighting unit for illuminating the eye by radiating light of a predetermined luminosity. The system also includes an image recognition unit having an optical system consisting of a plurality of lenses for gathering light and a pickup device for imaging the iris.

FIG. 1 schematically illustrates an iris recognition system according to the conventional art. The iris recognition system mainly includes a front case 10 and an image recognition unit 3. At the center of the front case 10, a guidance unit 20 is disposed to guide an eye of a person to be positioned on the optical axis of the iris recognition system. In front of the image recognition unit 3, an optical system having a plurality of lens 5 is disposed. At the rear of the image recognition unit 3, a pickup device 7 for detecting an image passed through the lenses 5 is installed. Below the image recognition unit 3, a fixing frame 4 fixes the image recognition unit 3 to an enclosure 4 by a connecting unit 6.

In the thusly configured iris recognition system, an image of the eye (e) of a person is delivered to the pickup device 7 via the lens 5, and then the image of the iris of the eye is recognized. The iris image thusly detected from the pickup device 7 is compared with an image previously registered in a computer (not shown).

In order to precisely detect the iris, an image of the iris must be precisely captured in the pickup device. In order for the iris image to precisely reach the pickup device via the optical system, optical axes of the guidance unit for guiding the eye, the optical system having a plurality of lenses, and the pickup device for imaging the iris of an eye must all coincide. In other words, each center of the guidance unit, optical system, and pickup device must be in a straight line.

No matter how slightly the guidance unit, optical system, and pickup device deviate from the same optical axis, it becomes impossible to precisely recognize the iris. So, it is very important to precisely adjust the optical axes of the components of the system. In an actual production process, however, optical axes of these components may not match one another. In particular, even though the optical axis of the optical system of the image recognition unit precisely matches that of the pickup device, there may occur a case that the optical axis of the guidance unit does not match that of the image recognition unit due to an assembling process.

FIGS. 2A through 2C illustrate an image 7' captured by the pickup device 7 in several cases. In all of these three cases, the eye is disposed at the same position in front of the guidance unit. However, when the optical axis of the guidance unit is different from that of the image recognition unit, e.g., in FIGS. 2A and 2C, the iris (e') captured in the pickup device is shown differently. FIG. 2A shows a lower part of the iris in a cut-off state, and FIG. 2C shows an upper part of the iris in a similar cut-off state. Even though a person precisely locates his or her eye in front of the guidance unit, the reliability of the iris recognition system will be reduced unless the entire image of the iris (e') is present on the pickup device 7.

Hence, there is a need to prevent such a defective image by having some way to adjust the device when the optical axis of, e.g., the guidance unit 20 does not match the optical axes of the other components.

SUMMARY OF THE INVENTION

Accordingly, the present invention is directed to a semiconductor package and fabricating method the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above-described objects of the present invention, there is provided an iris recognition system including: a guidance unit for guiding the position of an eye; an image recognition unit for recognizing the image of the eye passed through the guidance unit; and an optical axis adjustment unit for aligning the optical axes of the image recognition unit and guidance unit.

The optical axis adjustment unit makes the optical axis of the guidance unit adjustable by vertically or horizontally moving the image recognition unit. With the movement in a horizontal direction, a lateral linear movement or horizontal rotating movement is possible. The vertical and horizontal movement of the optical axis adjustment unit can be operated manually, or can be automatically controlled by having a driving unit, such as a motor.

Therefore, it is an advantage of the present invention to provide an iris recognition system for precisely recognizing an iris. Another advantage of the present invention is providing a unit for adjusting the relative optical axes of a guidance unit and image recognition unit of the iris recognition system for the purpose of precise iris recognition. Another advantage of the present invention is not increasing the volume of the iris recognition system even if an optical axis adjusting unit is provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
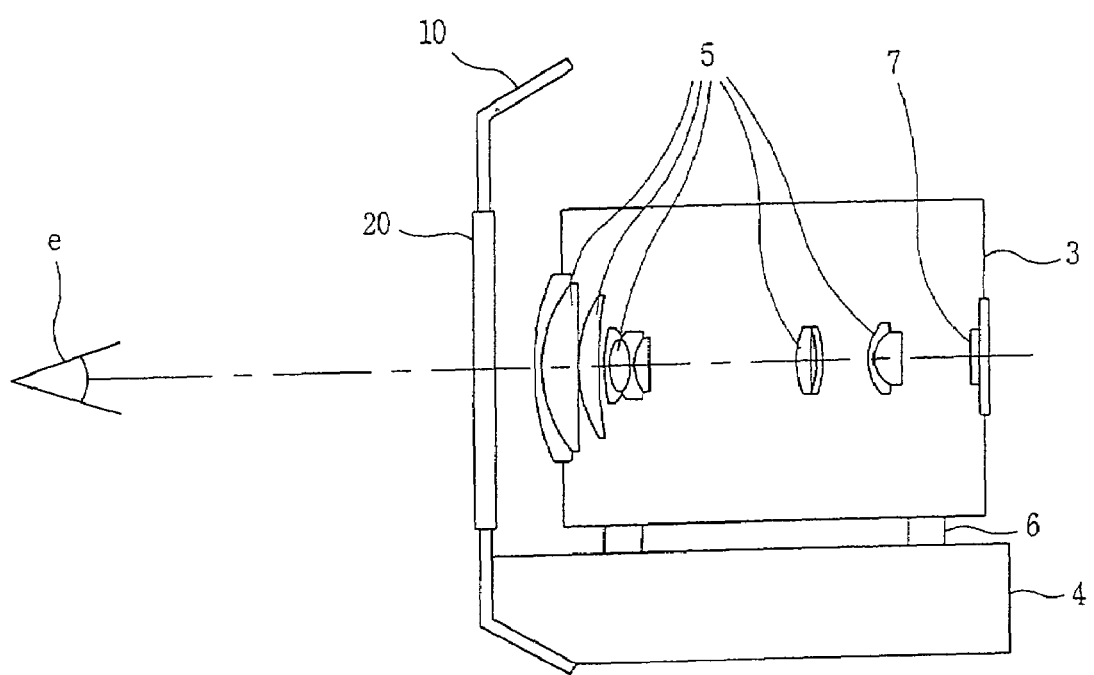
FIG. 1 schematically illustrates an iris recognition system according to the prior art.
Figure 2A:
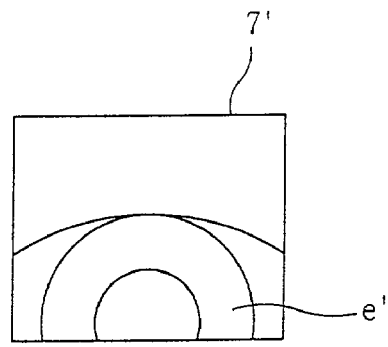
FIGS. 2A through 2C illustrate an image captured by a pickup device in several cases.
Figure 2B:
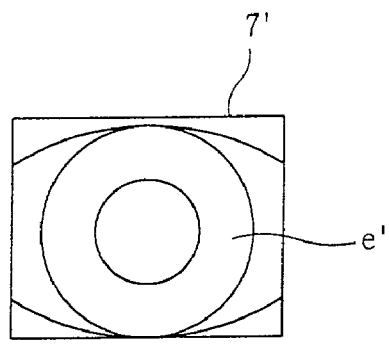
Figure 2C:
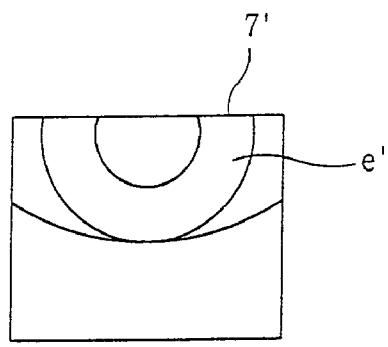

Reference will now be made in detail to the preferred embodiments of the present invention, examples of which are illustrated in the accompanying drawings. Where possible, the same reference numerals will be used to illustrate like elements throughout the specification.

The iris recognition system of the present invention can adjust the relative optical axes of a guidance unit for guiding the position of an eye and an image recognition unit for recognizing the image of an iris passed through the guidance unit by way of an optical axis adjustment unit. This system will be described generally, followed by an exemplary embodiment.

The present invention includes a guidance unit for guiding an eye to a predetermined position in front of a lens; a lighting unit for providing illumination of the eye by radiating light above a certain luminosity; an image recognition unit including an optical system having a plurality of lenses for gathering light and a pickup device for imaging the iris of the eye; and an optical axis adjustment unit for adjusting the relative optical axes of the image recognition unit and the guidance unit.

The optical axis adjustment unit adjusts the relative optical axes of the image recognition unit and the guidance unit by vertically and/or horizontally moving the image recognition unit, so as to align the optical axes. With the movement in a horizontal direction, a lateral linear movement or horizontal rotating movement is possible. The vertical and horizontal movement of the optical axis adjustment unit can be operated manually without a driving unit, or can be automatically controlled by a driving unit, such as a motor. In order to lower the unit cost without increasing the size of the iris recognition system, it is preferred that the optical axis adjustment unit is configured to be manually operated.

The optical axis adjustment unit includes a horizontal movement unit for horizontally moving the image recognition unit and a vertical movement unit for vertically moving the image recognition unit. The vertical movement unit can be installed on the horizontal movement unit and vice versa. Other various designs are also possible.

The optical axis adjustment unit is preferably disposed at the bottom surface of the image recognition unit, and also can be disposed at the sides or top surface thereof according to the use and characteristics of the product.

The guidance unit of the present invention serves to guide either eye of a person to a predetermined position in front of the lens, and is installed at the front surface of the iris recognition system in addition to the image recognition unit. The guidance unit forms a guidance region in which a person can locate his or her eye precisely at the lens on the front surface of the system. For example, a circular or rectangular guidance region is printed at the center of the guidance unit. When the subject looks at the guidance region, the iris of the eye can be precisely captured in the image recognition unit. By forming such a guidance region on the guidance unit, there is no need to install any additional guidance components, such as a head mounter or a guidance guide.

The guidance unit is made of glass or transparent plastic, and preferably is a half-mirror. Generally, the lighting unit of the iris recognition system uses infrared rays as a light source. The reason for this is that infrared rays pass through glasses or sunglasses better than visible light rays do. The half-mirror guidance unit is particularly good when infrared rays are used as a light source, because it transmits infrared rays while reflecting visible rays.

Figure 3:
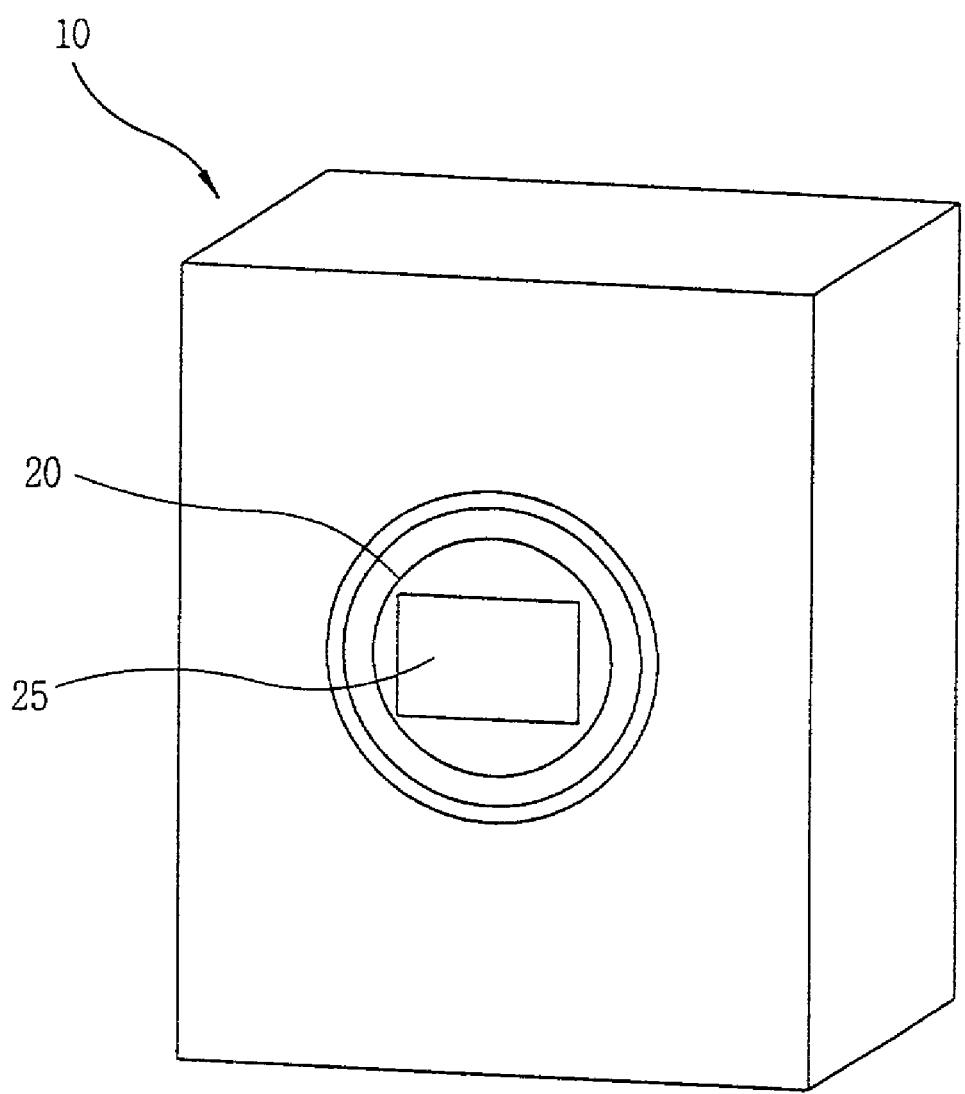
FIG. 3 illustrates a guidance unit in the iris recognition system of the present invention.

FIG. 3 is a perspective view of one embodiment of a guidance unit according to the present invention. The guidance unit 20 is formed at the center of the front case 10, and a rectangle is printed as the guidance region 25 at the center of the front surface of the guidance unit.

The optical axis adjustment unit of the present invention can be incorporated in a variety of embodiments so as to align the optical axis of the guidance unit by vertically and horizontally moving the image recognition unit. An embodiment in which the optical axis of the guidance unit can be aligned manually without a driving unit will be described hereinafter.

Figure 4A:
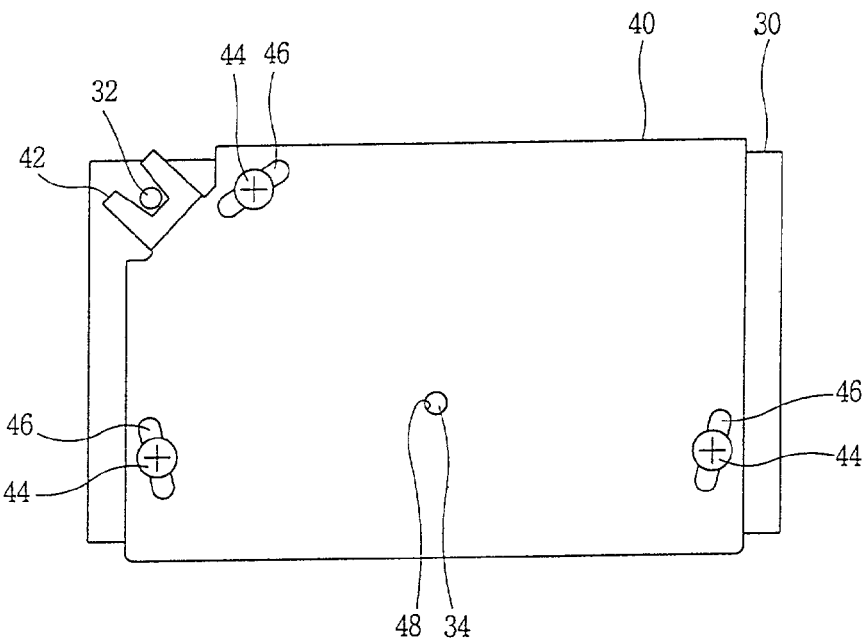
FIGS. 4A and 4B illustrate a horizontal movement unit of an optical axis adjustment unit according to an embodiment of the present invention.
Figure 4B:
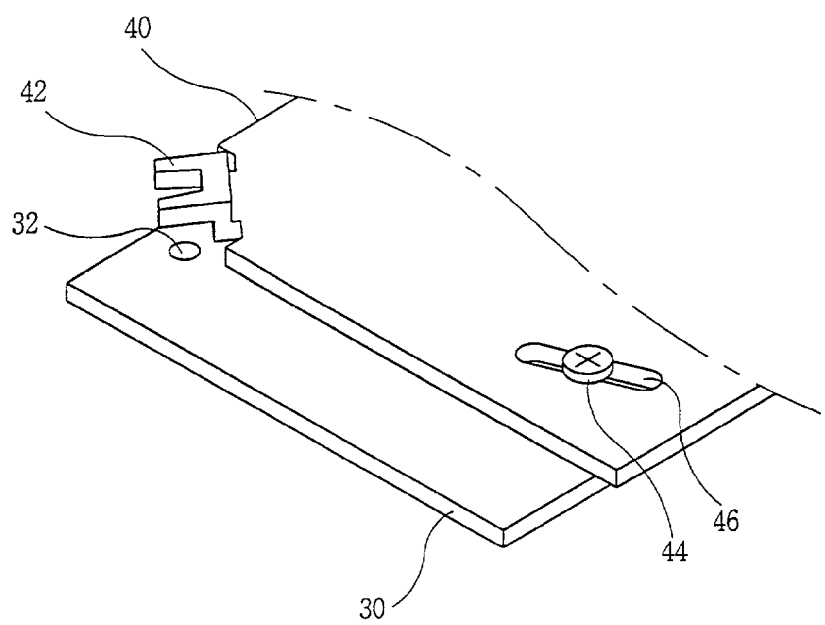

FIGS. 4A and 4B illustrate the horizontal movement unit of the optical axis adjustment unit. FIG. 4A is a plane view of the horizontal movement unit, in which a horizontal movement frame 40 is coupled to the top surface of a fixing frame 30. The fixing frame 30 is engaged with the front case 10 of FIG. 3, and the image recognition unit (not shown) is connected to the top surface of the horizontal movement frame. A hole 48 is formed at the center of the top surface of the horizontal movement frame 40, and an extrusion unit 34 is formed at the center of the top surface of the fixing frame 30. The extrusion unit 34 is inserted into the hole 48. This hole 48 becomes the center of rotation of the horizontal movement frame 40 on the fixing frame 30. Another hole 32 is formed at one edge of the fixing frame 30. At a position corresponding to the hole 32, an adjustment guide 42 is formed at one corner of the horizontal movement frame 40. The adjustment guide 42 is formed higher than other portions of the horizontal movement frame 40. The adjustment guide 42 is indented at the center thereof, and has extrusion units at the left and right of the center indentation. FIG. 4B is a perspective view illustrating the adjustment guide portion of FIG. 4A in detail.

Such a structure enables the rotating movement of the horizontal movement frame 40. With the respect to the rotating movement, a thin, long bar is inserted into the hole 32 on the fixing frame to thus contact either one of the two extrusion units (using the lever principle), whereby the horizontal movement frame rotates round the extrusion unit at the center of the fixing frame. By this rotation of the movement frame 40, the rotation of the image recognition unit engaged with the top surface of the horizontal movement frame is made possible. Accordingly the adjustment of the optical axis of the image recognition unit in a horizontal direction is made possible.

On the horizontal movement frame, a long rotation guide hole 46 is formed at the position in the same radius around the central hole 48. The long rotation guide hole 46 determines the rotatable range of the horizontal movement frame. A fixing unit 44 (e.g., a set screw) is coupled to the rotation guide long hole. The fixing unit 44 allows rotation of the horizontal movement frame as much as desired, and then stops the horizontal movement frame at that position. Thus, the optical axis of the image recognition unit on the horizontal movement frame is prevented from being further changed when fixed by the fixing unit 44.

As seen from above, the embodiment in which the horizontal movement frame of the optical axis adjustment unit is horizontally rotated for the horizontal movement of the image recognition unit has been described. However, this embodiment can be changed into a structure in which the horizontal movement frame can move in a horizontal linear direction by forming the long rotation guide hole of the horizontal movement frame to be perpendicular to the optical axis and removing the extrusion unit on the fixing frame.

Figure 5:
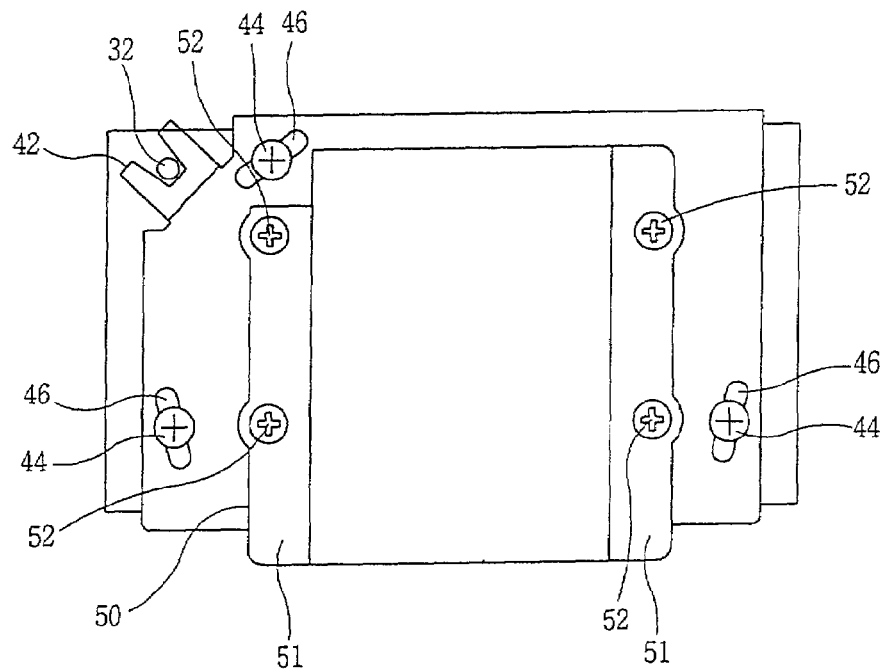
FIG. 5 illustrates a vertical movement unit of the optical axis adjustment unit according to the embodiment of the present invention.

FIG. 5 illustrates the vertical movement unit of the optical axis adjustment unit. As illustrated therein, it will be appreciated that a lifting frame 50 is installed on the top surface of the horizontal movement frame 40. Such a structure advantageously reduces the size of the system since both horizontal movement and vertical movement can be performed on the same plane. Unlike that illustrated in FIG. 5, it is also possible to arrange a structure in which the horizontal movement frame 40 is installed instead on the top surface of the lifting frame 50, according to the purpose of its usage.

A lifting control unit 51 is formed at both ends of the lifting frame. The lifting control unit is curved being higher than the center of the lifting frame. The lifting control unit 51 includes more than two vent holes punched at both ends of the lifting frame and a lifting guide bar 52 extended from the vent holes to the fixing frame 30 or horizontal movement frame 40 to be fixed thereto. The lifting guide bar has a screw thread on its outer surface, and has a stopper 52' at its upper end. The lifting guide bar has a function of controlling the gap between the lifting frame and the fixing frame 30 or horizontal movement frame 40.

Figure 6:
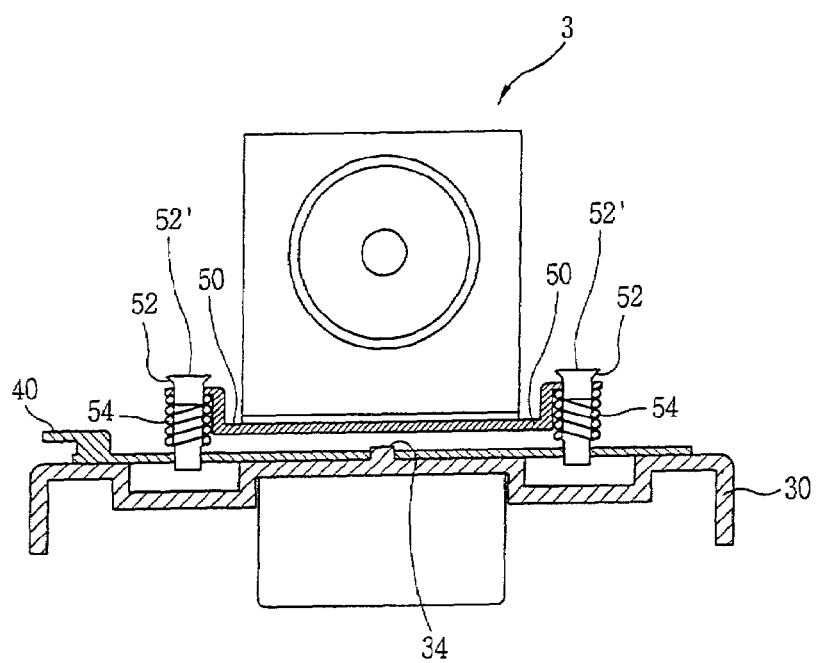
FIG. 6 illustrates a structure in which the vertical movement unit and the horizontal movement unit are coupled with each other.

FIG. 6 is a cross-sectional view illustrating the optical axis adjustment unit of the present invention, in which the horizontal movement frame 40 is installed on the fixing frame 30, and the lifting frame 50 is installed on the horizontal movement frame 40. In addition, the image recognition unit 3 is disposed on the lifting frame. The lifting frame and the horizontal movement frame are connected with each other by way of the lifting guide bar of the lifting control unit. The screw thread is formed on the outer surface of the lifting guide bar, and the gap between the lifting frame and the horizontal movement frame can be controlled by moving the lifting guide bar. In order for the lifting guide bar of the lifting control unit to be connected to the horizontal movement frame, a lifting guide bar connecting hole has to be formed on the horizontal movement frame.

On the outer surface of the lifting guide bar, as illustrated in FIG. 6, an elastic member can be installed. Such an elastic member serves to upwardly support the lifting frame for thereby fixing the vertical directional position of the image recognition unit placed on the fixing frame. In FIG. 6, the elastic member is represented as a spring. Anything that upwardly supports the lifting frame between the lifting frame and the horizontal movement frame can be the elastic member.

The lifting frame ascends up to the stopper 52' of the lifting guide bar by way of the elastic force of the elastic member. The height of the lifting frame varies according to the degree of insertion of the lifting guide bar having the screw thread on its outer surface into the horizontal movement frame.

As described above, the optical axis adjustment unit of the present invention makes the image recognition unit of the iris recognition system move in a vertical or horizontal direction. Thus, if the optical axis of the image recognition unit does not match that of the guidance unit, the optical axes thereof can be easily adjusted. Therefore, the occurrence of a defective item due to the mismatch between the optical axes can be easily prevented, and more precise iris recognition is enabled, resulting in the increase in the reliability of the iris recognition system.

In particular, since the position of the image recognition unit can be manually controlled without a driving unit, the cost of production is not largely increased, and the size of the product is not much affected, thus greatly increasing the productivity of the iris recognition system.

It will be apparent to those skilled in the art that various modifications and variations can be made in the iris recognition system according to the present invention without departing from the spirit or scope of the invention. For example, although the optical axis adjustment unit has been described as moving the image recognition unit, an alternate embodiment could move the guidance unit instead. It is envisioned that the alignment procedure is performed by the manufacturer of the apparatus using an image generated by the image recognition unit. However, other possible permutations are the use of a dedicated test jig to determine how closely the optical axes are aligned, and adjustment as necessary by the user of the apparatus. Further, if the adjustment units contain motors or actuators for aligning the optical axes, this process may be performed automatically via a testing or alignment algorithm within a controller of the actuators. Thus, it is intended that the present invention covers the modifications and variations of the invention provided they come within the scope of the appended claims and their equivalents.

The invention claimed is:

1. An iris recognition apparatus, comprising:
a guidance unit, having an optical axis, to guide the position of an eye;
an image recognition unit, having an optical axis, to recognize an image of an iris passed through the guidance unit; and
an optical axis adjustment unit having a vertical movement unit to move the image recognition unit in a vertical direction and a horizontal movement unit to move the image recognition unit in a horizontal direction, in order to align optical axes of the image recognition unit and guidance unit,
wherein the guidance unit has a guidance region printed at a center of a front surface thereof so that a person can locate his or her eye at the guidance unit.

2. The apparatus according to claim 1, wherein the guidance unit transmits infrared radiation, and reflects visible radiation.

3. The apparatus according to claim 1, wherein the horizontal movement unit of the optical axis adjustment unit moves linearly in a horizontal direction.

4. The apparatus according to claim 1, wherein the horizontal movement unit of the optical axis adjustment unit moves rotationally in a horizontal direction.

5. An iris recognition apparatus, comprising:
- a guidance unit, having an optical axis, to guide an eye to a predetermined position in front of a lens;
- a light to provide illumination of the eye by radiating light of more than a predetermined luminosity;
- an image recognition unit, having an optical axis, including an optical system having a plurality of lenses for gathering light and a pickup device for imaging an iris of the eye;
- a fixing frame supporting the image recognition unit from below and being engaged with the guidance unit; and
- an optical axis adjustment unit having a vertical movement unit for vertically moving the image recognition unit and a horizontal movement unit for horizontally moving the image recognition unit for adjusting the optical axis of the image recognition unit and guidance unit,
- wherein the guidance unit has a guidance region printed at a center of a front surface thereof so that a person can locate his or her eye at the guidance unit.

6. The apparatus according to claim 5, wherein the guidance unit transmits infrared radiation, and reflects visible radiation.

7. The apparatus according to claim 5, wherein the horizontal movement unit of the optical axis adjustment unit moves linearly in a horizontal direction.

8. The apparatus according to claim 5, wherein the horizontal movement unit of the optical axis adjustment unit moves rotationally in a horizontal direction.

9. The apparatus according to claim 8, wherein the horizontal movement unit includes
- a horizontal movement frame installed on a top surface of the fixing frame, said horizontal movement frame having a hole formed at a center of the top surface thereof, the fixing frame having an extrusion unit formed at the center of the top surface thereof and having another hole formed at one edge thereof, and the horizontal movement frame having an adjustment guide formed at a position corresponding to the hole on the fixing frame at one corner thereof.

10. The apparatus according to claim 9, wherein the adjustment guide is formed higher than other portions of the horizontal movement frame, is indented at a center thereof, and has extrusion units at left and right portions thereof.

11. The apparatus according to claim 9, wherein, on the horizontal movement frame, more than one long rotation guide hole are formed at positions in a common radius around the central hole.

12. The apparatus according to claim 9, wherein a fixing part is coupled to the long rotation guide hole.

13. The apparatus according to claim 5, wherein the vertical movement unit includes
- a lifting frame installed on a top surface of the fixing frame, said lifting frame having a lifting control unit curved being higher than a center of the lifting frame at both ends thereof, said lifting control unit including more than two vent holes punched at both ends of the lifting frame and a lifting guide bar extended from the vent holes to the fixing frame to be thus fixed thereto.

14. The apparatus according to claim 13, wherein the lifting guide bar has a screw thread formed on its outer surface, and has a stopper formed at its upper end.

15. The apparatus according to claim 14, wherein an elastic member is installed on an outer surface of the lifting guide bar.

16. An optical recognition apparatus, comprising:
- a guidance unit to guide an eye into an appropriate position for recognition, the guidance unit having an optical axis, wherein the guidance unit has a guidance region printed at a center of a front surface thereof so that a person can locate his or her eye at the guidance unit;
- an optical axis alignment unit connected to one of the guidance unit and the image recognition unit to align the optical axes of the image recognition unit and guidance unit.

17. The apparatus according to claim 16, wherein the alignment unit is connected to the guidance unit, and operates to move the optical axis of the guidance unit.

18. The apparatus according to claim 16, wherein the alignment unit is connected to the image recognition unit, and operates to move the optical axis of the image recognition unit.

19. The apparatus according to claim 18, wherein the alignment unit is operable to translate the optical axis in more than one direction.

20. The apparatus according to claim 18, wherein the alignment unit is manually adjustable.

21. The apparatus according to claim 18, wherein the alignment unit includes at least one actuator to move the optical axis.

* * * * *